United States Patent
Murakami et al.

(10) Patent No.: US 7,070,368 B2
(45) Date of Patent: Jul. 4, 2006

(54) METHOD FOR SETTING A MACHINING FEED RATE AND A MACHINE TOOL USING THE SAME

(75) Inventors: Shinji Murakami, Toyota (JP); Kazuya Hattori, Nagoya (JP); Yoshihiko Yamada, Kasugai (JP); Tadashi Otani, Anjo (JP); Atsushi Saito, Aichi-ken (JP)

(73) Assignee: Toyoda Koki Kabushiki Kaisja, Kariya (JP)

( * ) Notice: Subject to any disclaimer, the term of this patent is extended or adjusted under 35 U.S.C. 154(b) by 282 days.

(21) Appl. No.: 10/255,693

(22) Filed: Sep. 27, 2002

(65) Prior Publication Data

US 2003/0118416 A1   Jun. 26, 2003

(30) Foreign Application Priority Data

Sep. 27, 2001   (JP) .............................. 2001-297234

(51) Int. Cl.
*B23Q 15/00*   (2006.01)

(52) U.S. Cl. .......................... 409/84; 409/80; 700/172; 700/173; 700/188

(58) Field of Classification Search ............ 409/79–80, 409/84, 132; 700/188, 63, 172–173; 318/571
See application file for complete search history.

(56) References Cited

U.S. PATENT DOCUMENTS

| | | | | |
|---|---|---|---|---|
| 3,979,653 A | * | 9/1976 | Cutler .......................... | 318/571 |
| 4,757,457 A | * | 7/1988 | Matsumoto .................. | 700/188 |
| 5,200,680 A | * | 4/1993 | Sasaki et al. ................ | 318/571 |
| 5,444,636 A | * | 8/1995 | Yoshida et al. .............. | 700/188 |
| 5,827,020 A | * | 10/1998 | Fujita et al. .................... | 409/80 |
| 6,317,646 B1 | * | 11/2001 | de Caussin et al. .......... | 700/173 |

FOREIGN PATENT DOCUMENTS

| | | | | |
|---|---|---|---|---|
| JP | 63-105870 A | * | 5/1988 | |
| JP | 2-72414 A | * | 3/1990 | |
| JP | 4-245505 | | 9/1992 | |
| JP | 6-79580 A | * | 3/1994 | |
| JP | 7-40190 | | 2/1995 | |

* cited by examiner

*Primary Examiner*—Erica Cadugan
(74) *Attorney, Agent, or Firm*—Oblon, Spivak, McClelland, Maier & Neustadt, P.C.

(57) ABSTRACT

A machining feed rate for machining a workpiece portion to be machined by a machining tool based upon a machining program is set by reading a data of the workpiece portion, by sectionalizing the workpiece portion in an area corresponding to a workpiece shape of the workpiece portion, and by determining a shape change point based upon a workpiece shape of the workpiece portion. The machining feed rate is set for each area and for each shape change point with reference to a predetermined parameter corresponding to an attribute of the each sectionalized area and corresponding to an attribute of the each determined shape change point.

30 Claims, 8 Drawing Sheets

- - - - AREA: STRAIGHT LINE
⌒ AREA: CURVED LINE

○ SHARP CHANGE POINTS: SUCCESSIVE (NO BENT ANGLE)
▽ SHARP CHANGE POINTS: LARGE BENT ANGLE
◇ SHARP CHANGE POINTS: SMALL BENT ANGLE

FIG. 6

| MACHINING MODE | AREA | | | | SHAPE CHANGE POINT | | |
|---|---|---|---|---|---|---|---|
| | CURVED LINE | | STRAIGHT LINE | SUCCESSIVE (NO BENT ANGLE) | LARGE BENT ANGLE | FINE ANGLE EDGE | |
| | Rj ≤ Rh | Rj > Rh | | | | | |
| | ALLOWABLE ACCELERATION ad | ALLOWABLE ACCELERATION ae | SPEED COEFFICIENT α | ALLOWABLE ACCELERATION as | CORNER SPEED cs | FINE ANGULAR SPEED Fd | |
| HIGH-SPEED (MACHINING TIME PRECEDING MODE) | 3 m/s² | 5 m/s² | 1.5 | 1 m/s² | 1 m/min | 3 m/min | |
| STANDARD | 1 m/s² | 2 m/s² | 1.0 | 0.5 m/s² | 0.5 m/s² | 2 m/min | |
| LOW-SPEED (MACHINING PRECISION PRECEDING MODE) | 0.2 m/s² | 0.5 m/s² | 0.5 | 0.2 m/s² | 0.1 m/min | 0.5 m/min | |
| .. | .. | .. | .. | .. | .. | .. | |

METHOD FOR SETTING A MACHINING FEED RATE AND A MACHINE TOOL USING THE SAME

CROSS REFERENCE TO RELATED APPLICATIONS

This application is based on and claims priority under 35 U.S.C. §119 with respect to a Japanese Patent Application No. 2001-297234, filed on Sep. 27, 2001, the entire content of which is incorporated herein by reference.

BACKGROUND OF THE INVENTION

1. Field of the Invention

The present invention relates to a method for setting a machining feed rate of a machine tool, in which a workpiece is machined by a machining means based upon a machining program, and to the machine tool using that method.

2. Description of the Related Art

Conventionally, there have been two known methods for setting a machining parameter (e.g., a machining feed rate) so as to machine a workpiece to a certain contour shape in accordance with that machining parameter by a numerically controlled machine tool (i.e., an NC machine tool) on which a computer numerical controller (i.e., a CNC) is installed. According to one of the two known methods, a tentative machining feed rate is set based upon an NC data read in advance so as to prevent an acceleration in a radius direction of an arc interconnected with adjacent three points from exceeding a predetermined value. According to the other one of the two known methods, a tentative machining feed rate is set based upon an NC data read in advance so as to prevent a speed differential in a direction of each moving axis due to a bent angle at a central point among adjacent three points from exceeding a predetermined value. A machining feed rate can be set through some processes such as an accelerating/decelerating operation prior to an interpolating operation, a feedforward operation and the like after setting the tentative machining feed rate by use of the above-described method. That is, the machining feed rate is set through the optimum method in order to achieve a desired machining precision and a desired machining efficiency (i.e., a desired machining time), for example by use of a single method of the above-described methods or by combining the above-described methods.

According to the aforementioned conventional methods for setting the machining feed rate, the tentative machining feed rate is set based upon a local data among the adjacent three points on the workpiece (e.g., a contour shape) in stead of recognizing an entire workpiece or a part of the workpiece. Therefore, values of the machining speed rate may largely fluctuate even within a particular machined range such as a straight area or a curved area each of which contour shape variation is small. This problem occurs due to the following factor. A radius of an arc interconnected with the adjacent three points or the bent angle may fluctuate due to a rounding error raised when generating the NC data in a unit of 1 μm or 0.1 μm.

For instance, when a smooth arc shape, which is generated by approximating a straight line, or a free-form surface is machined, the tentative machining feed rate is set only based upon adjacent three local points according to the conventional method for setting the machining feed rate. In this case, values of the tentative machining feed rate may largely fluctuate. That may lead to a fluctuation of a final machining speed rate. Therefore, the workpiece to be machined may not be capable of being machined with an optimum machining precision. Further, the machining feed rate may be decelerated in comparison with a machining feed rate set based upon the whole workpiece to be machined.

In the conventional method, a differential value of the acceleration in the moving axis is changed on an arc shape portion with a small degree, because the machining feed rate is set based upon the adjacent three local points on the work portion. Therefore, an optimum machined surface can be obtained. However, a differential value of the acceleration in the moving axis is largely changed on a portion transforming from the arc shape to a straight shape, e.g., at a shape change point. In this case, an optimum machined surface may not be able to be obtained. To overcome this problem, the machining feed rate at the workpiece to be machined is required to be, as a whole, decelerated by reducing a setting value (i.e., a parameter) for setting the machining feed rate.

For instance, there is a case that a crossed edge surface with a fine angle (hereinafter referred to as a fine angle edge) is required to be machined accurately and sharply. Here, the fine angle is defined by two crossing flat surfaces, and is may especially set to be substantially equal to 3° or smaller than that. However, if the fine angle edge is machined by the above-described method for setting the machining feed rate, the parameter for setting the tentative machining feed rate is required to be extremely small so as to reduce the whole machining feed rate. As a result of the reduction in the whole machining feed rate, the machining efficiency may be hence deteriorated.

Accordingly, the present invention therefore seeks to provide an improved method for setting the machining feed rate of the machine tool which is capable of setting an optimum machining feed rate corresponding to the machined shape and to provide an improved machining apparatus provided with the improved method for setting the machining feed rate.

SUMMARY OF THE INVENTION

The present invention is devised to solve the aforementioned problems, therefore, it is a primary object of the present invention to provide an improved method for setting a machining feed rate of a machine tool which is capable of setting an optimum machining feed rate corresponding to the work shape and to provide an improved machine tool provided with the improved method for setting the machining feed rate.

According to an aspect of the present invention, a method for setting a machining feed rate of a machine tool for machining a workpiece to be machined by a machining means based upon a machining program, includes the steps of reading a data of the workpiece to be machined, sectionalizing the workpiece in an area corresponding to a work shape of the workpiece, setting a machining feed rate for each area with reference to a predetermined parameter corresponding to an attribute of the each sectionalized area, and machining the workpiece based upon the set machining feed rate. Therefore, an optimum machining feed rate can be set for each sectionalized area of the workpiece to be machined. Further, the stabilized machining feed rate with small fluctuation can be set for each area.

According to another aspect of the present invention, a method for setting a machining feed rate of a machine tool for machining a workpiece to be machined by a machining means based upon a machining program, includes the steps of reading a data of the workpiece to be machined, determining a shape change point based upon a work shape of the workpiece, setting a machining feed rate for each shape change point with reference to a predetermined parameter corresponding to an attribute of the each determined shape change point, and machining the workpiece based upon the set machining feed rate. Therefore, an optimum machining feed rate corresponding to the workpiece can be set for each determined shape change point.

According to further aspect of the present invention, a method for setting a machining feed rate of a machine tool for machining a workpiece to be machined by a machining means based upon a machining program, includes the steps of reading a data of the workpiece to be machined, sectionalizing the workpiece in an area corresponding to a work shape of the workpiece and determining a shape change point based upon a to a work shape of the workpiece, setting a machining feed rate for each area and for each shape change point with reference to a predetermined parameter corresponding to an attribute of the each sectionalized area and corresponding to an attribute of the each determined shape change point, and machining the work portion based upon the set machining feed rate. Therefore, an optimum machining feed rate corresponding to the workpiece can be set for each sectionalized are and for each determined shape change point.

More particularly, the workpiece to be machined can be sectionalized in a straight area and in a curved area. The curved area can be sectionalized in an area corresponding to a curvature. Therefore, an optimum machining feed rate corresponding to the work shape can be set for each attribute of each sectionalized area. The whole machining feed rate is not required to be decelerated for improving the machining precision at a part of the workpiece. Therefore, the whole machining speed and machining precision can be effectively improved.

The attribute of the shape change point can be determined corresponding to a bent angle of the shape change point with reference to a predetermined parameter. Therefore, even when the workpiece includes a shape change point with a fine angle edge, the work shape can be machined with high sharpness and precision.

The machining feed rate can be set corresponding to a machining mode. The machining mode includes any one of a machining time preceding mode, a machining precision preceding mode, a machining time and precision standard mode.

According to another aspect of the present invention, a machine tool provided with a method for setting a machining feed rate includes a machining means for machining a workpiece to be machined, and a control device for controlling machining the workpiece based upon a machining program. The control device sets the machining feed rate in accordance the method for setting the machining feed rate. Therefore, the machining operation can be controlled at an optimum machining feed rate corresponding to the work shape. The machine tool can further includes an external device for setting the machining feed rate in accordance with the method for setting the machining feed rate and for supplying the machining feed rate to the control device. Therefore, the load applied to the control device can be reduced.

BRIEF DESCRIPTION OF THE DRAWING FIGURES

Various other objects, features and attendant advantages of the present invention will readily be appreciated as the same becomes better understood by reference to the following detailed description of a preferred embodiment when considered in connection with the accompanying drawings, in which:

FIG. 6 is a graph explaining an example of a set value of each parameter corresponding to each machining mode;

DESCRIPTION OF THE PREFERRED EMBODIMENT

Figure 1:
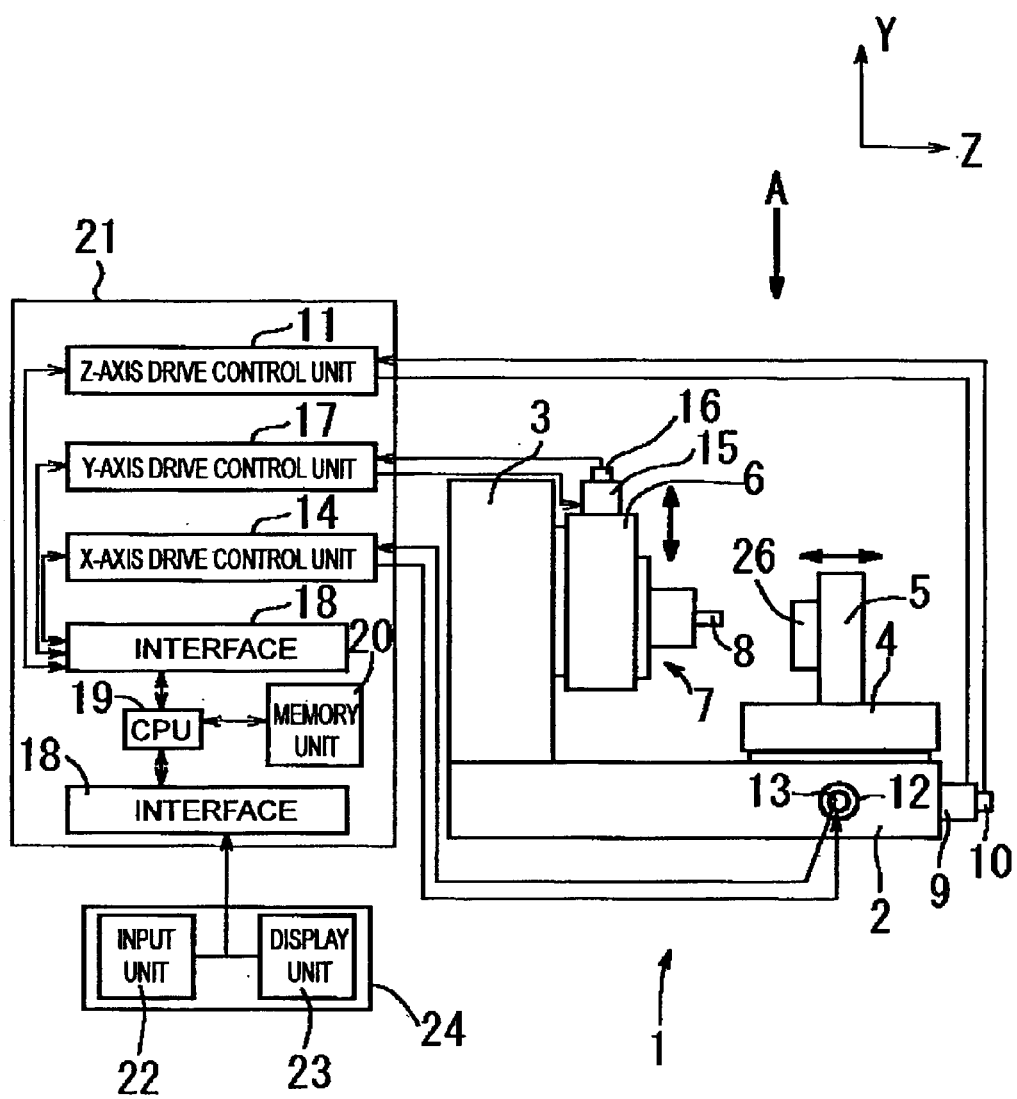
FIG. 1 is a schematic view showing a structure of a machine tool according to the embodiment of the present invention.

An embodiment of the present invention will be described with reference to FIGS. 1 to 8. Referring to FIG. 1, the present embodiment exemplifies the case in which a machine tool 1 for machining a contour of a metal mold is equipped with a computer numerical controller (hereinafter referred to as a CNC) having three numeral control axes which are an unillustrated X-axis, a Y-axis, and a Z-axis. The drive directions of the machine tool 1 are a Z-axis direction (a right-hand side/left-hand side direction in FIG. 1) illustrated with an arrow, a Y-axis direction (a top/bottom direction in FIG. 1) illustrated with an arrow, and an unillustrated X-axis direction (a direction perpendicular to the sheet of FIG. 1).

The machine tool 1 includes an operation section 24, a control section 21, and a machining section for machining a workpiece 26. The machining section includes a bed 2 provided with a table 4, on which a jig 5 for supporting the workpiece 26 and the workpiece 26 are placed, and a column 3 for supporting a tool slide 6. The bed 2 is equipped with a Z-axis servomotor 9 for moving the table 4 in the Z-axis direction and an X-axis servomotor 12 for moving the table 4 in the X-axis direction. The Z-axis servomotor 9 and the X-axis servomotor 12 are attached with a Z-axis encoder 10 and an X-axis encoder 13, respectively. Each position of the table 4 in the Z-axis direction and in the X-axis direction can be detected by each encoder 10 and 13.

The column 3 is equipped with the tool slide 6 to be movable in the Y-axis direction. The tool slide 6 is equipped with a Y-axis servomotor 15 for moving the tool slide 6 in the Y-axis direction. The Y-axis servomotor 15 is attached with a Y-axis encoder 16 for detecting a position of the tool slide 6 in the Y-axis direction. The tool slide 6 is assembled with a tool 8 (i.e., a machining means) via a tool main spindle 7. The tool 8 has a rotational axis in the Z-axis direction and is rotated by a motor (not shown) around the rotational axis. According to the embodiment of the present invention, an example is explained, in which the tool 8 is employed for machining a contour of a surface of the workpiece 26 facing the tool 8.

The operation section 24 includes an input unit 22 to which machining parameters, machining modes, and so on is inputted, and provides a display unit 23. Driving operations for the table 4 and the tool slide 6 can be controlled in response to an operation of the input unit 22, and the rotation of the tool 8 can be also controlled in response thereto. The display unit 23 displays a machining-program setting screen for creating/editing an NC data and an NC program (i.e., a machining program). The display unit 23 further displays the machining parameters to be set.

The control section 21 is composed of a Z-axis drive control circuit 11, a Y-axis drive control circuit 17, an X-axis drive control circuit 14, a central processing unit (hereinafter referred to as a CPU) 19, a memory unit 20, and the like. The Z-axis drive control circuit 11 is connected to the Z-axis servomotor 9 and the Z-axis encoder 10, and is further connected to the CPU 19 via an interface 18. The Y-axis drive control circuit 17 is connected to the Y-axis servomotor 15 and the Y-axis encoder 16, and is further connected to the CPU 19 via the interface 18. The X-axis drive control circuit 14 is connected to the X-axis servomotor 12 and the X-axis encoder 13, and is further connected to the CPU 19 via the interface 18. The memory unit 20 is made of such an unillustrated random access memory (RAM), an unillustrated read only memory (ROM), and an unillustrated hard disc drive (HDD) for memorizing the machining program, the machining parameter, the machining mode, and the like.

Figure 2A:
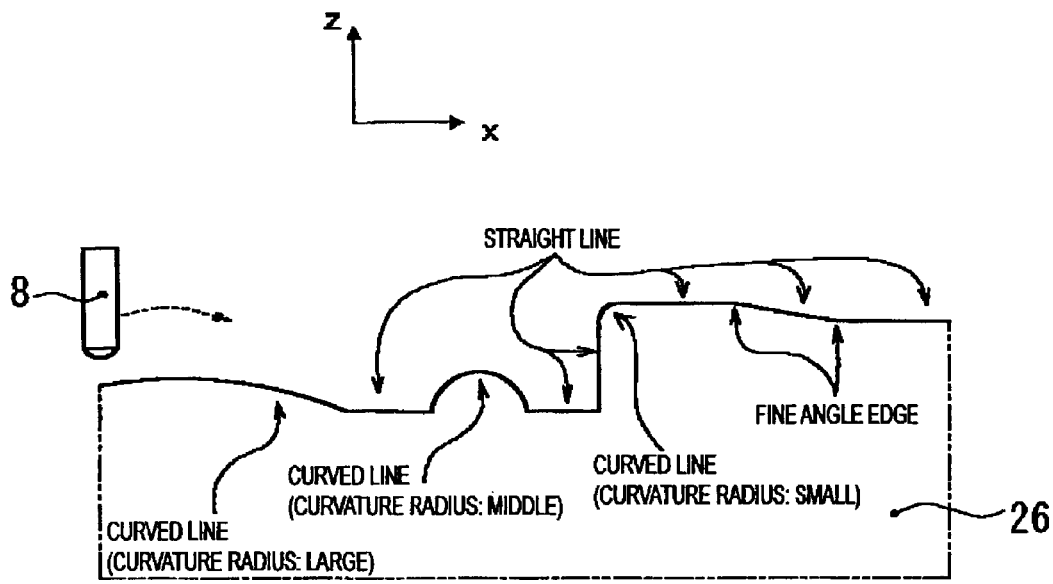
FIG. 2(A) is a drawing showing a tool 8 and a workpiece 26 in view of an A-direction in FIG. 1.
Figure 2B:
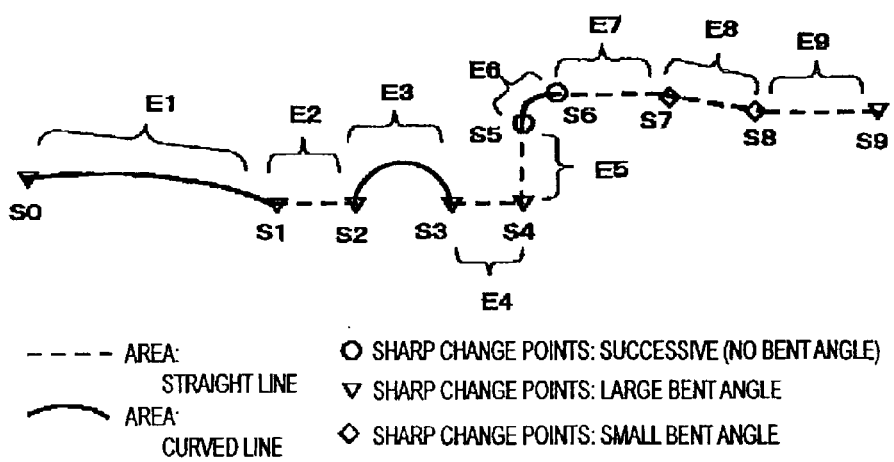
FIG. 2(B) is a drawing showing a part of a workpiece portion (a contour shape) of the workpiece 26 illustrated in FIG. 2(A)

Next, referring to FIG. 2, a method for sectionalizing the workpiece portion of the workpiece 26 is explained hereinbelow. FIG. 2(A) is a view illustrating the tool 8 and the machined workpiece 26 viewed from the above, i.e., in view of an A-direction in FIG. 1. FIG. 2(B) is a view illustrating a part of the workpiece portion (e.g., a contour) of the workpiece 26 illustrated in FIG. 2(A). Referring to FIG. 2(B), the workpiece portion of the workpiece 26 is sectionalized in straight areas E2, E4, E5, E7, E8, and E9 denoted by a doted line in FIG. 2(B) and in curved areas E1, E3, and E6 denoted by a solid line of in FIG. 2(B). The workpiece portion of the workpiece 26 is further sectionalized in shape change points S5 and S6 denoted by a symbol ○ in FIG. 2(B), which are assumed not to have a bent angle and successively connect a front shape of each shape change point and a rear shape thereof, respectively, shape change points S0, S1, S2, S3, S4, and S9 denoted by a symbol ∇ in FIG. 2(B), which are provided with a large bent angle, respectively, and shape change points S7 and S8 denoted by a symbol ◇ in FIG. 2(B), which are provided with the bent angle of a fine angle edge, respectively. The machining feed rate is set every sectionalized area and shape change point.

Next, a method for sectionalizing the workpiece portion of the workpiece 26 and the method for setting the machining feed rate every sectionalized area and shape change point, will be explained in detail with reference to FIGS. 3, 4, 5, and 6.

Figure 3A:
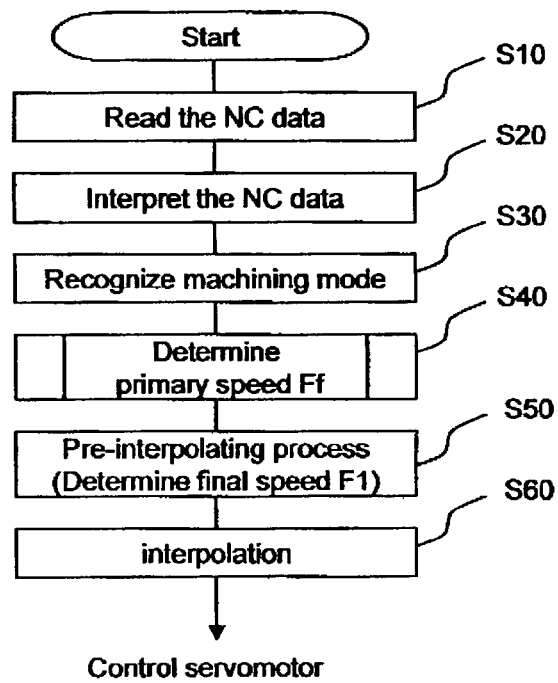
FIG. 3(A) is a flow chart for explaining a method for sectionalizing the workpiece portion of the workpiece 26 in an area and a shape change point and a method for setting a machining feed rate for each sectionalized area and shape change point.

As explained by a flow chart of FIG. 3(A), the machining feed rate is set by use of the NC data, and the servomotors 9, 12, and 15 are operated based upon the set machining feed rate for machining the workpiece portion of the workpiece 26.

At step S10 the NC data is read previously. More particularly, the NC data of the whole workpiece portion or the NC data of a part of the workpiece portion is previously read for recognizing a machined shape of the workpiece portion of the workpiece 26. At step S20, the read-in NC data is interpreted. At step S30, the machining mode is recognized. The machining mode is set by the input unit 22 or based upon the NC program prior to starting the machining operation. The machining mode can be selected from three types; a high speed feed, a standard speed feed, and a low speed feed, which all are shown in FIG. 6. At step S40, a primary speed Ff is determined. At step S50, a final speed Fl is determined by applying the primary speed Ff with a pre-interpolating process. At step S60, a speed of each control axis (i.e., the X-axis, the Y-axis, and the Z-axis) is calculated by use of the final speed Fl so as to control each servomotor 9 for the Z-axis, 12 for the X-axis, and 15 for the Y-axis. For example, in a case that a machining feed rate is changed, e.g., in a case that the machining operation is moved from the area to the shape change point, an interpolating operation is performed for smoothly changing the primary speed Ff The method for setting the machining feed rate of the present invention is characterized in a process at step S40.

Figure 3B:
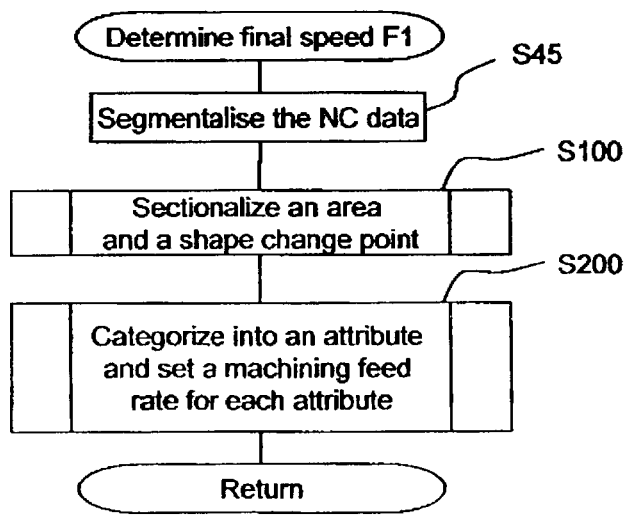
FIG. 3(B) is a flow chart for explaining more details about the process performed at step S40 illustrated in FIG. 3(A)

Referring to FIG. 3(B), the determination of the primary speed Ff at step S40 is described in more detail hereinbelow.

At step S45, the NC data is segmentalized. More particularly, the NC data of the work portion is segmentalized for properly performing following processes at steps S100 and S200 just in case the NC data may include a long line segment so that the points described in the NC data are not sufficient for recognizing the shape and for determining the primary speed Ff. The NC data can be segmentalized by adding a point every reference lapse of time (e.g., every 1 ms), by dividing the NC data every reference distance (e.g., 0.5 mm), or by other methods. At step S100, the area and the shape change point is sectionalized based upon the segmentalized NC data. At step S200, the area and the shape change point are categorized by plural attributes, respectively and the machining feed rate is set corresponding to each categorized attribute. The program then returns to the process illustrated in FIG. 3(A) and proceeds to step S50.

As described above, the machining feed rate setting method of the present invention is characterized in that the machining feed rate is set for each area and for each shape change point on the work shape recognized in a wide range such as a whole workpiece portion or a part of the workpiece portion. Therefore, the machining feed rate setting method of the present invention is not the same as the conventional machining feed rate setting method, in which the machining feed rate is set in view of only adjacent three local points.

Figure 4A:
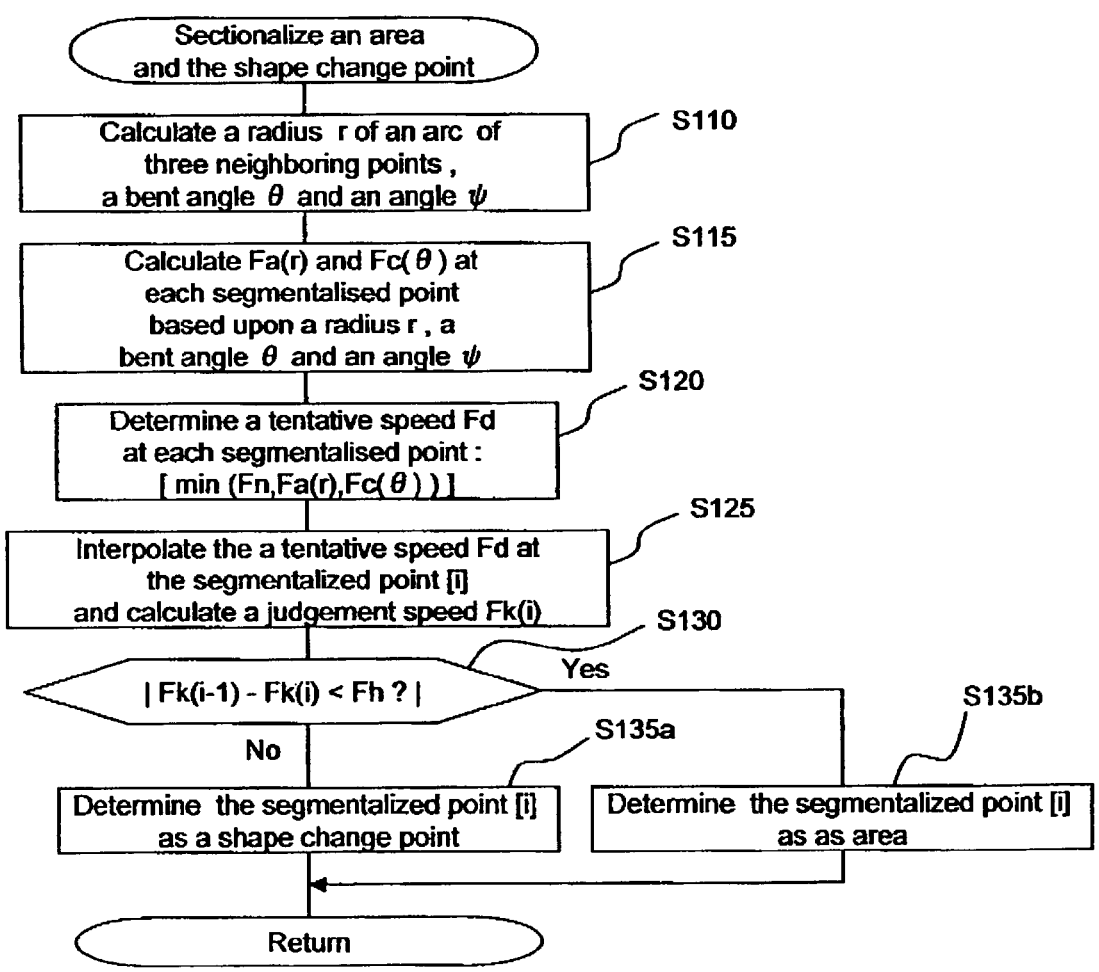
FIG. 4(A) is a flow chart for explaining more details about the sectionalizing process performed at step S100 illustrated in FIG. 3(B) and for, FIG. 4(B) is a drawing for illustrating an arc radius r, a brake angle θ, and an angle ψ for setting the machining feed rate corresponding to each work shape.

Referring to FIG. 4(A), the sectionalizing process of the workpiece portion in the area and the shape change point at step S100 is described in more detail hereinbelow.

Figure 4B:
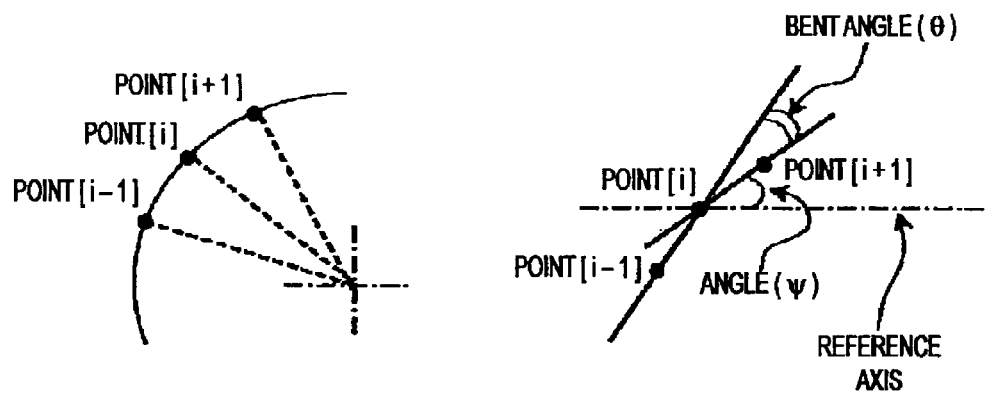
Figure 8:
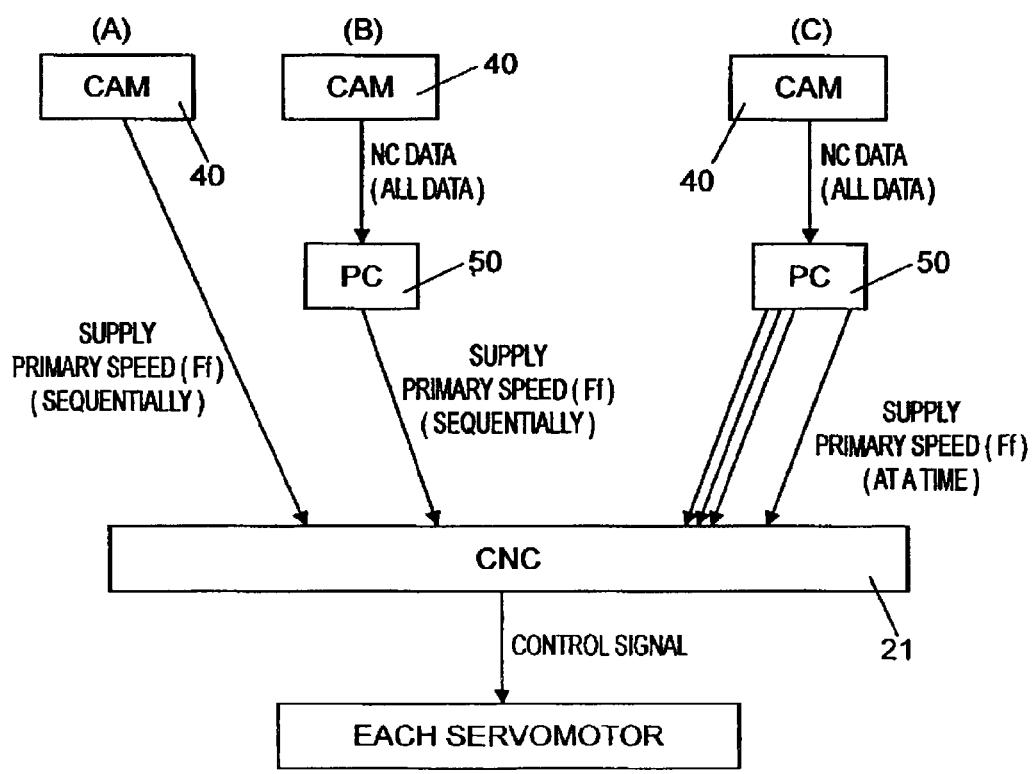
FIGS. 8(A), 8(B), and 8(C) are block views showing other structures of the machine tool of the present invention, in which the machining feed rate is set based upon the method for setting the machining feed rate of the present invention.

At step S110, a radius r of an arc depicted with adjacent three points, a bent angle θ defined thereby, and an angle ψ relative to a reference axis (e.g., the X-axis) defined thereby are calculated. As illustrated in FIG. 4(B), the adjacent three points include a point [i−1], a point [i], and a point [i+1]. The bent angle θ is defined by a straight line running through the point [i−1] and the point [i] and the other straight line running through the point [i] and the point [i+1]. The angle ψ is defined by the reference axis and the straight line running through the point [i] and the point [i+1]. At step S115, a speed Fa (r) is calculated based upon the arc radius r calculated at step S110 and a speed Fc (θ) is calculated based upon the bent angle θ and the angle ψ which both were calculated at step S110. The speeds Fa (r) and Fc (θ) can be calculated by a conventional calculating method. For example, the speed Fa (r) is calculated based upon the arc radius r in accordance with a formula: $\sqrt{(a*r)}$. The parameter a represents a predetermined acceleration for sectionalizing the workpiece portion in the area and the shape change point. The speed Fc (θ) is calculated as described below. A speed from the point [i−1] to the point [i] and a speed from the point [i] to the point [i+1] are set for maintaining the speed Fc (θ) at a constant value. A speed differential in each axial direction between a speed vector Fc1, which runs from the point [i−1] to the point [i], and a speed vector Fc2, which runs from the point [i] to the point [i+1], is preset at a coefficient C. Each axial speed of each speed vector Fc1 and Fc2 is geometrically calculated based upon a relationship between the bent angle θ and the angle ψ. The speed Fc (θ) is calculated to prevent the speed differential from exceeding the coefficient C.

At step S120, the minimum speed (i.e., a tentative speed Fd) is selected among a speed Fn preset in the NC data, the speeds Fa (r), and Fc (θ). At step S125, the selected minimum speed (i.e., the tentative feed rate Fd) is interpolated through a smoothing operation and the like so as to calculate a judgment speed Fk [i] at the segmentalized point [i]. At step S130 the CPU judges whether or not an absolute value of a difference between the judgment speed Fk [i] at the segmentalized point [i] and a judgment speed Fk [i−1] at a last segmentalized point [i−1] is smaller than a predetermined speed Fh. When the absolute value is smaller than the predetermined speed Fh, the program proceeds to step S135b. At step S135b, the CPU judges that the segmentalized point [i] is the area since a variation of the judgment speed Fk is small. On the other hand, when it is judged that the absolute value is not smaller than the predetermined speed Fh at step S130, the program proceeds to step S135a. At step S135a, the CPU judges that the segmentalized point [i] is the shape change point since the variation of the judgment speed Fk is large. The program then returns to the process illustrated in FIG. 3(B) from either step S135b or step S135a and proceeds to step S200.

Figure 5:
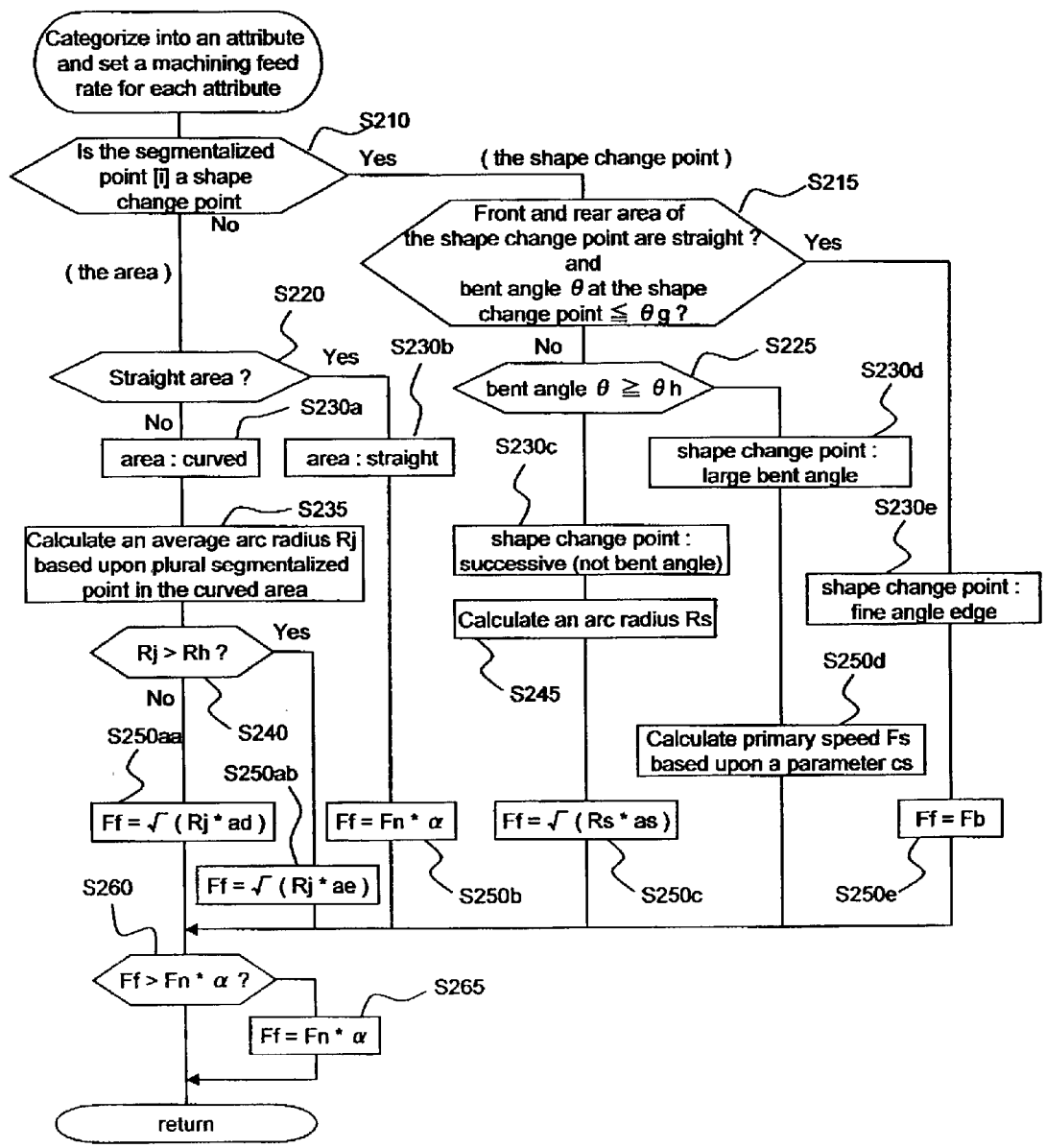
FIG. 5 is a flow chart for explaining more details about the process for categorizing the workpiece portion into an attribute of each area and an attribute of each shape change point, which is performed at step S200 illustrated in FIG. 3(B)

Referring to FIG. 5, the categorizing process of each area and each shape change point in each attribute at step S200 and the method for setting the machining feed rate for each attribute are described in more detail hereinbelow. First of all, at step S210, the CPU judges whether or not the segmentalized point [i] is the shape change point.

When the segmentalized point [i] is not judged at step S210 to be the shape change point, the segmentalized point [i] is judged to be the straight area. Therefore, the program proceeds to step S220 for judging whether or not the segmentalized point [i] is the straight area. The segmentalized point [i] is judged to be the straight area when any segmentalized point is not defined up to the next shape change point or when the bent angle θ at the segmentalized point [i] is substantially equal to a value of zero.

When the segmentalized point [i] is not judged to be straight at step S220, the program proceeds to step S230a for judging that the segmentalized point [i] is categorized into an attribute of the curved area. The program further proceeds to step S235 for obtaining an average arc radius Rj based upon plural segmentalized points in the curved area. According to the embodiment of the present invention, the average arc radius Rj is obtained at step S235. Alternatively, an arc radius r of a representative segmental point in the curved area can be obtained at step S235. The program further proceeds to step S240 for judging whether or not the average arc radius Rj is greater than a predetermined arc radius Rh. As described above, the curved area is further sectionalized into areas corresponding to a curvature. Further, the curved area can be sectionalized into plural areas corresponding to plural curvatures.

When the average arc radius Rj is not judged at step S240 to be greater than the predetermined arc radius Rh, the program proceeds to step S250aa for setting the primary speed Ff at a value calculated in accordance with a formula: $\sqrt{(Rj*ad)}$. The program then proceeds to step S260. On the other hand, when the average arc radius Rj is judged at step S240 to be greater than the predetermined arc radius Rh, the program proceeds to step S250ab for setting the primary speed Ff at a value calculated in accordance with a formula: $\sqrt{(Rj*ae)}$. The progm then proceeds to step S260. Each parameter ad and ae represents a predetermined value indicating acceleration for setting the machining feed rate so as to secure the machining precision at each curved area corresponding to each machining mode.

On the other hand, when the segmentalized point [i] is judged to be straight at step S220, the program proceeds to step S230b for judging that the segmentalized point [i] is categorized into an attribute of the straight area. The program then proceeds to step S250b for setting the primary speed Ff at a value calculated in accordance with a formula: Fn*α. The program then proceeds to step S260. The value Fn represents a speed prescribed by the NC data. The parameter α represents a coefficient which is employed for adjusting the primary speed Ff at the final stage. The parameter α is generally set at a value of 1. However, the parameter α can be changed to be a desired value.

When the segmentalized point i) is judged to be the shape change point at step S210, the program proceeds to step S215. At step S215, the CPU judges whether or not a front area of the shape change point and the rear area thereof are straight, and judges whether or not the bent angle θ at the shape change point is substantially equal to a predetermined angle θg or smaller than that.

When the CPU judges at step S215 that the front and rear areas of the shape change point are straight and that the bent angle θ is substantially equal to or smaller than the predetermined angle θg, the program proceeds to step S230e for judging that the shape change point is categorized into an attribute of the shape change point with the fine angle edge (i.e., with a fine bent angle). The predetermined angle θg is set to be, for example 3° for sharpening the machined shape with a high machining precision. Therefore, the predetermined angle θg demands special attention to be set. The program then proceeds to step S250e for setting the primary speed Ff to be equal to a value Fb. The program then proceeds to step S260. The parameter Fb is set for securing the machining precision at the shape change point with the fine angle edge corresponding to each machining mode, especially for securing a sharpened finish shape after the machining operation.

As described above, according to the embodiment of the present invention, the shape change point can be categorized into the attribute of the shape change point with the fine angle edge. Therefore, the contour at the shape change point with the fine angle edge can be machined to generate a sharp edge without decelerating the machining feed rate at the other areas and shape change points.

On the other hand, when the CPU judges at step S215 either that the front and rear areas of the shape change point are not straight or that the bent angle θ is not substantially equal to or smaller than the predetermined angle θg, the program proceeds to step S225 for judging whether or not the bent angle θ is substantially equal to or greater than a predetermined angle θh. The predetermined angle θh can be set, for example at 30°. When the bent angle θ is judged to be substantially equal to or greater than the predetermined angle θh, the program proceeds to step S230d for judging that the shape change point is categorized into an attribute of the shape change point with the large bent angle. The program then proceeds to step S250d for obtaining the primary speed Ff based upon the bent angle θ by three points including neighboring segmentalized points, the angle ψ relative to the reference axis (e.g., the X-axis), and a parameter cs, in the same manner as the calculation of the speed Fc (θ) at step S115. However, the coefficient C representing the speed differential and employed for calculating the machining feed rate Fc (θ) is substituted by the parameter cs. The parameter cs represents a predetermined speed parameter employed for securing the machining precision at the shape change point with the large bent angle corresponding to each machining mode. The program then proceeds to step S260.

When the bent angle θ is judged to be smaller than the predetermined angle θh at step S225, the program proceeds to step S230c. At step S230c, the CPU judges that the shape change point is categorized into an attribute of the shape change point which is assumed not to have the bent angle and should smoothly and successively connect front and rear shapes of the shape change point. The program then proceeds to step S245 for calculating an arc radius Rs at the shape change point. The arc radius Rs can be determined based upon three points including adjacent segmentalized point. The program further proceeds to step S250c for setting the primary speed Ff at a value calculated in accordance with the formula $\sqrt{(RS*as)}$. The program then proceeds to step S260. The parameter as represents a predetermined acceleration parameter for securing the machining precision at the shape change point which is assumed not to have the bent angle and should successively connect the front and rear shapes of the shape change point, corresponding to each machining mode, especially for securing the machining precision due to the differential of acceleration.

At step S260, the CPU judges whether or not the primary speed Ff is greater than a predetermined value calculated in accordance with a formula: (Fn*α). When the primary speed Ff is greater than the predetermined speed (Fn*α), the program proceeds to step S265 for setting the primary speed Ff at the value (Fn*α) and returns to the process illustrated in FIG. 3(A). On the other hand, when the primary speed Ff is substantially equal to or smaller than the predetermined speed (Fn*α), the program returns to the process illustrated in FIG. 3(A) without updating the primary speed Ff.

As described above, according to the embodiment of the present invention, the work portion of the workpiece 26 is recognized not locally but in a wide range. The work portion of the workpiece 26 is then categorized into each attribute of each area or into each attribute of each shape change point as being explained at each step S230a through S230e of FIG. 5. The machining feed rate is set at the primary speed Ff denoted at each step S250aa through S250e of FIG. 5 corresponding to each attribute of each area or each attribute of each shape change point.

Next, a set value of each parameter associated with the primary speed Ff denoted at steps S250aa through S250e is described hereinbelow with reference to FIG. 6. Each parameter is set at one of a high speed, a standard speed, and a low speed corresponding to the selected machining mode. The speed Fn denoted at steps S250aa through S250e and steps S260, S265 is the speed prescribed by the NC data. The parameters ad, ae, α, as, cs, and Fb denoted at steps S250aa through S250e are set by use of values illustrated in FIG. 6, respectively. For example, when the standard machining mode is selected, the parameter ad is set at 1 m/s$^2$, the parameter ae is set at 2 m/s$^2$, the parameter α is set at 1.0, the parameter as is set at 0.5 m/s$^2$, the parameter cs is set at 0.5 m/min, and the parameter Fb is set at 2 m/min.

Figure 7A:
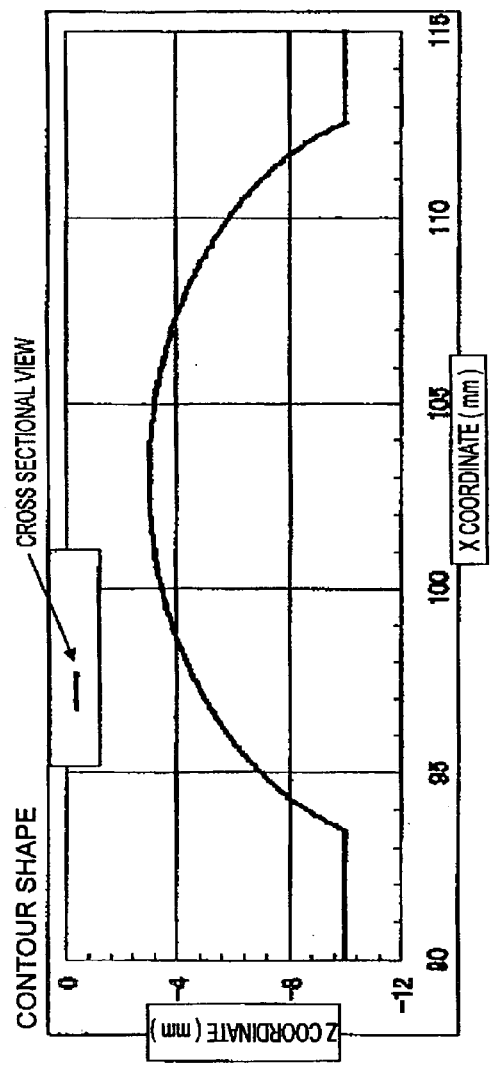
FIG. 7(A) is a diagram showing a part of the workpiece portion illustrated in FIG. 2(A)

Next, some effects proved by the method for setting the machining feed rate of the present invention are described hereinbelow with reference to FIGS. 7(A) and 7(B). A horizontal axis of FIG. 7 represents the control axis of the X-axis and a vertical axis thereof represents the control axis of the Z-axis. FIG. 7(A) shows a shape corresponding to the curved area of which curvature radius is middle in FIG. 2(A).

Figure 7B:
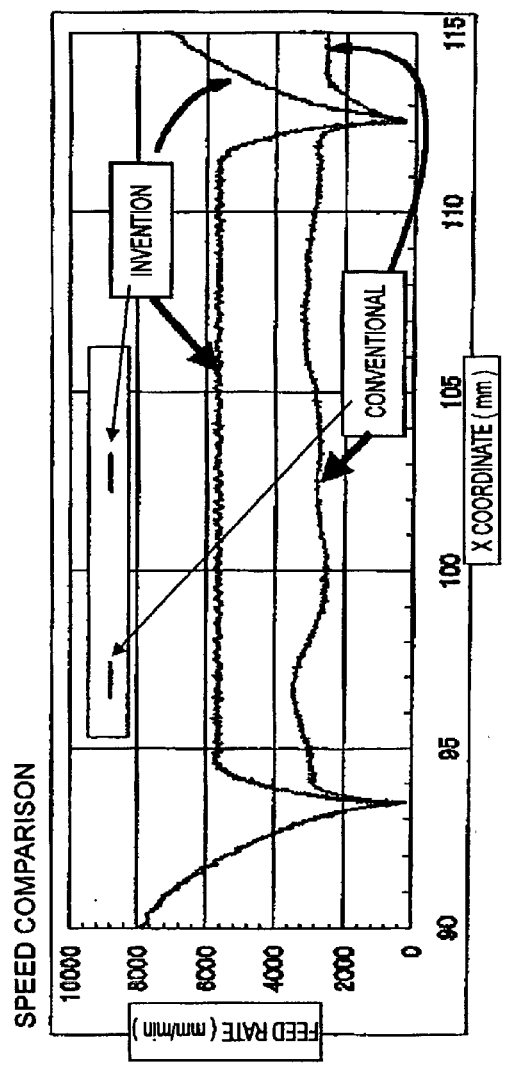
FIG. 7(B) is a diagram showing effects proved by the method for setting the machining feed rate according to the embodiment of the present invention.

Referring to FIG. 7(B), when the workpiece 26 is machined from the left-hand side in FIG. 7(A) toward the right-hand side therein, there is no difference between the machining feed rate setting method of the present invention and the conventional machining feed rate setting method, within a straight area of the work shape which is illustrated at the left-hand side of FIG. 7(A), i.e., within a straight area of which X-coordinate is substantially equal to or smaller than 93.5 mm. However, the whole machining feed rate set by the conventional method is small and the machining feed rate largely fluctuates within a curved area of the workpiece shape, i.e. within a curved area of which X-coordinate is substantially equal to and greater than 93.5 mm and substantially equal to and smaller than 112.5 mm. This problem occurs due to the following factors. The machining program causes a rounding error when the NC data is generated by a unit of 1 μm. According to the conventional method, the tentative machining feed rate is calculated based upon three local neighboring points. The tentative machining feed rate is accelerated or decelerated prior to being interpolated. The final machining feed rate hence tends to be set at a smaller value among the fluctuated tentative machining feed rate. Therefore, the whole machining feed rate may be decelerated and may largely fluctuate.

To the contrary, according to the machining feed rate setting method of the present invention, the machining feed rate of the curved area can be determined by recognizing the workpiece shape in a wide range and by calculating the average radius in the area, and the like. Therefore, the machining feed rate can be effectively stabilized without fluctuation.

In the same manner, the machining feed rate set by the conventional method is smaller within a straight area of the work shape which is illustrated at the right-hand side of FIG. 7(A), i.e. within a straight area of which X-coordinate is substantially equal to or greater than 112.5 mm. To the contrary, the machining feed rate set by the method of the present invention can be effectively improved and stabilized without fluctuation, as illustrated in FIG. 7(B).

According to the conventional method for setting the machining feed rate, the whole machining feed rate is decelerated due to the fine angle edge and the shape change point transforming from the arc shape to the straight shape. To the contrary, according to the embodiment of the present invention, the tentative machining speed can be set independently of the fine angle edge and the shape change point transforming from the arc shape to the straight shape. Therefore, an optimum machining feed rate can be applied to the workpiece portion corresponding to the machined shape. The shape change point transforming from the arc shape to the straight shape is a portion at which a differential of acceleration of the control axis is largely changed.

As aforementioned, according to the method for setting the machining feed rate of the present invention, the machining time can be minimized with a high machining efficiency and a higher machining precision can be achieved.

According to the embodiment of the present invention, the machining feed rate can be determined by performing all aforementioned steps by the control section 21. Alternatively, referring to FIGS. 8(A), (B), and (C), examples of other structures of the machining apparatus are described, in which the machining feed rate is set by the method for setting the machining feed rate of the embodiment of the present invention. In this case, the control section 21 performs the process at step S50 in FIG. 3(A) (i.e., the pre-interpolating process) and the processes after step S50. More particularly, a load applied to the control section 21 can be reduced by using an external device 40 (such as a CAM) provided with a high computing ability and/or an external device 50 (such as a personal computer). Further, the calculating process time can be shortened 30 by employing the external devices 40 and/or 50 when the shape of the work portion is complicated.

According to the first structure of the machine tool illustrated in FIG. 8(A), the primary speed Ff is set by performing the processes at steps S10 through S40 illustrated in FIG. 3(A) by the external device 40 based upon the data of the workpiece to be machined. The machining data including the primary speed Ff are supplied to the control section 21 at a time. According to the second structure of the machine tool illustrated in FIG. 8(B), the NC data is supplied to the external device 50 from the external device 40. The primary speed Ff is set by performing the processes at steps S10 through S40 illustrated in FIG. 3(A) by the external device 50 based upon the NC data. The machining data including the primary speed Ff are supplied to the control section 21 from the external device 50 at a time. According to the third structure of the machine tool illustrated in FIG. 8(C), the NC data is supplied to the external device 50 from the external device 40. The primary speed Ff is set by performing the processes at steps S10 through S40 illustrated in FIG. 3(A) by the external device 50 based upon the NC data. The machining data including the primary speed Ff can be sequentially supplied to the control section 21 when the calculating operation of each primary speed Ff is completed. Further, the present invention can be applicable by the other structure of the machine tool, which is not provided with the external devices 40 and 50 and performs all processes by the control section 21. The structure of the machine tool is not limited to the above-described structures and can be various.

The method for setting the machining feed rate of the machining apparatus of the present invention and the machine tool is not limited to the above described procedures and structures. The method and the machine tool can be modified, added, and omitted without departing from the spirit of the present invention.

For example, according to the embodiment of the present invention, the machining feed rate is set corresponding to each attribute of the area, i.e. the straight area and the curved area, and corresponding to each attribute of the shape change point, i.e. the shape change point which is assumed not to have the bent angle and connects successively the front and rear shapes thereof, the shape change point with the larger bent angle, and the shape change point with the fine angle edge. Alternatively, the machining feed rate can be set only corresponding to each attribute of the area, i.e. the straight area and the curved area, or only corresponding to each attribute of the shape change point, i.e., the shape change point which is assumed not to have the bent angle and connects successively the front and rear shapes thereof, the shape change point with the larger bent angle, and the shape change point with the fine angle edge.

The attribute of each area and of each shape change point is not limited to the above-described attributes. The workpiece portion of the workpiece 26 of the present invention can be categorized into other various attributes.

According to the embodiment of the present invention, the machine tool is applicable for machining the contour of the metal mold. However, the machine tool of the present invention can be applicable for machining various workpieces. Further, the machine tool of the present invention is applicable for machining various work portions of various workpieces.

The segmentalising method, the procedure, and the parameters are not limited to the above-described embodiment of the present invention and FIGS. 3 through 6. Various segmentalising methods, various procedures, and various parameters are applicable.

The machining feed rate is not limited to the speed of the X-axis, the Y-axis, and the Z-axis. The machining feed rate can be represented by a rotation speed of the tool 8, and other various speeds.

The numeric values according to the embodiment of the present invention are employed as one of examples. Therefore, the present invention is not limited to the above-described numeric values.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, 30 be embraced thereby.

What is claimed is:

1. A method for setting a machining feed rate of a machine tool for machining a workpiece portion to be machined by a machining means based upon a machining program, comprising the steps of:

reading a data of the workpiece portion to be machined;

segmentalizing the data into plural data points;

sectionalizing the workpiece portion using the segmentalized data points;

classifying the sectionalized workpiece portion at each of the segmentalized data points as an area or a shape change of the workpiece shape;

setting a machining feed rate for each area with reference to a predetermined parameter corresponding to an attribute of the sectionalized workpiece portion, and machining the workpiece portion based upon the set machining feed rate.

2. A method for setting a machining feed rate of a machine tool according to claim 1, wherein the sectionalized portion classified as an area has an attribute as one of a straight area and a curved area.

3. A method for setting a machining feed rate of a machine tool according to claim 2, wherein the curved area has an attribute as an area corresponding to a curvature.

4. A method for setting a machining feed rate of a machine tool according to claim 1, wherein the machining feed rate is set corresponding to a machining mode.

5. A method for setting a machining feed rate of a machine tool according to claim 4, wherein the machining mode includes any one of a machining time in a preceding mode, a machining precision in a preceding mode, and a machining time and precision in a standard mode.

6. A machine tool used for a method for setting a machining feed rate according to claim 4, comprising:
the machining means for machining the workpiece portion to be machined; and
a control device for setting the machining feed rate in accordance with the method for setting the machining feed rate and for controlling machining the workpiece portion based upon the machining program.

7. A machine tool used for a method for setting a machining feed rate according claim 4, comprising:
the machining means for machining the workpiece portion to be machined;
a device for setting the machining feed rate in accordance with the method for setting the machining feed rate; and
a control device supplied with the machining feed rate from the device for setting the machining feed rate and for controlling machining the workpiece portion based upon the machining program.

8. A method for setting a machining feed rate of a machine tool according to claim 1, wherein the machining means includes a tool for machining the workpiece portion to be machined.

9. A machine tool used for a method for setting a machining feed rate according to claim 1, comprising:
the machining means for machining the workpiece portion to be machined; and
a control device for setting the machining feed rate in accordance with the method for setting the machining feed rate and for controlling machining the workpiece portion based upon the machining program.

10. A machine tool used for a method for setting a machining feed rate according claim 1, comprising:
the machining means for machining the workpiece portion to be machined;
a device for setting the machining feed rate in accordance with the method for setting the machining feed rate; and
a control device supplied with the machining feed rate from the device and for controlling machining the workpiece portion based upon the machining program.

11. A method for setting a machining feed rate of a machine tool for machining a workpiece portion to be machined by a machining means based upon a machining program, comprising the steps of:
reading a data of the workpiece portion to be machined;
segmentalizing the data into plural data points;
determining a shape change point based upon a workpiece shape of the workpiece portion at each segmentalized data point;
setting a machining feed rate for each shape change point with reference to a respective predetermined parameter corresponding to an attribute of each determined shape change point; and
machining the workpiece portion based upon the set machining feed rate.

12. A method for setting a machining feed rate of a machine tool according to claim 11, wherein the attribute of the shape change point is determined corresponding to a bent angle of each shape change point.

13. A method for setting a machining feed rate of a machine tool according to claim 12, wherein each shape change point is categorized by one of three attributes comprising a first attribute in which a first shape change point does not have a bent angle connecting a front of the first shape change point and a rear of the first shape change point, a second attribute in which a second shape change point has a larger bent angle connecting a front of the second shape change point and a rear of the second shape change point, and a third attribute in which a third shape change point has a finer bent angle connecting a front of the third shape change point and a rear of the third shape change point, wherein the finer bent angle is smaller than the larger bent angle.

14. A method for setting a machining feed rate of a machine tool according to claim 11, wherein the machining feed rate is set corresponding to a machining mode.

15. A method for setting a machining feed rate of a machine tool according to claim 14, wherein the machining mode includes any one of a machining time in a preceding mode, a machining precision in a preceding mode, and a machining time and precision in a standard mode.

16. A machine tool used for a method for setting a machining feed rate according to claim 14, comprising:
the machining means for machining the workpiece portion to be machined; and
a control device for setting the machining feed rate in accordance with the method for setting the machining feed rate and for controlling machining the workpiece portion based upon the machining program.

17. A machine tool used for a method for setting a machining feed rate according claim 14, comprising:
the machining means for machining the workpiece portion to be machined;
a device for setting the machining feed rate in accordance with the method for setting the machining feed rate; and
a control device supplied with the machining feed rate from the device for setting the machining feed rate and for controlling machining the workpiece portion based upon the machining program.

18. A machine tool used for a method for setting a machining feed rate according to claim 11, comprising:
the machining means for machining the workpiece portion to be machined; and
a control device for setting the machining feed rate in accordance with the method for setting the machining feed rate and for controlling machining the workpiece portion based upon the machining program.

19. A machine tool used for a method for setting a machining feed rate according claim 11, comprising:
the machining means for machining the workpiece portion to be machined;
a device for setting the machining feed rate in accordance with the method for setting the machining feed rate; and a control device supplied with the machining feed rate from the device and for controlling machining the workpiece portion based upon the machining program.

20. A method for setting a machining feed rate of a machine tool for machining a workpiece portion to be machined by a machining means based upon a machining program, comprising the steps of:

reading a data of the workpiece portion to be machined;
segmentalizing the data into plural data points;
sectionalizing the workpiece using the segmentalized data points;
classifying the sectionalized workpiece portion at each of the segmentalized data points as an area or a shape change of the workpiece shape;
setting a machining feed rate for each area and for each shape change point with reference to a predetermined parameter corresponding to an attribute of each area and corresponding to an attribute of each determined shape change point; and
machining the workpiece portion based upon the set machining feed rate.

21. A method for setting a machining feed rate of a machine tool according to claim 20, wherein the sectionalized portion classified as an area has an attribute as one of a straight area and a curved area.

22. A method for setting a machining feed rate of a machine tool according to claim 21, wherein the curved area has an attribute as an area corresponding to a curvature.

23. A method for setting a machining feed rate of a machine tool according to claim 20, wherein the attribute of the shape change point is determined corresponding to a bent angle of the shape change point.

24. A method for setting a machining feed rate of a machine tool according to claim 23, wherein the shape change point is categorized by one of three attributes comprising a first attribute in which a first shape change point does not have a bent angle connecting a front of the first shape change point and a rear of the first shape change point, a second attribute in which a second shape change point has a larger bent angle connecting a front of the second shape change point and a rear of the second shape change point, and a third attribute in which a third shape change point has a finer bent angle connecting a front of the third shape change point and a rear of the third shape change point, wherein the finer bent angle is smaller than the larger bent angle.

25. A method for setting a machining feed rate of a machine tool, according to claim 20, wherein the machining feed rate is set corresponding to a machining mode.

26. A method for setting a machining feed rate of a machine tool according to claim 25, wherein the machining mode includes any one of a machining time in a preceding mode, a machining precision in a preceding mode, and a machining time and precision in a standard mode.

27. A machine tool used for a method for setting a machining feed rate according to claim 25, comprising:

the machining means for machining the workpiece portion to be machined; and
a control device for setting the machining feed rate in accordance with the method for setting the machining feed rate and for controlling machining the workpiece portion based upon the machining program.

28. A machine tool used for a method for setting a machining feed rate according claim 25, comprising:

the machining means for machining the workpiece portion to be machined;
a device for setting the machining feed rate in accordance with the method for setting the machining feed rate; and
a control device supplied with the machining feed rate from the device for setting the machining feed rate and for controlling machining the workpiece portion based upon the machining program.

29. A machine tool used for a method for setting a machining feed rate according to claim 20, comprising:

the machining means for machining the workpiece portion to be machined; and
a control device for setting the machining feed rate in accordance with the method for setting the machining feed rate and for controlling machining the workpiece portion based upon the machining program.

30. A machine tool used for a method for setting a machining feed rate according claim 20, comprising:

the machining means for machining the workpiece portion to be machined;
a device for setting the machining feed rate in accordance with the method for setting the machining feed rate; and
a control device supplied with the machining feed rate from the device and for controlling machining the workpiece portion based upon the machining program.

* * * * *